Sept. 24, 1957     H. A. ENGLE     2,807,764
SERVOMOTOR CONTROL SYSTEM
Filed April 1, 1954

HOMER A. ENGLE
INVENTOR.

BY *Lyon T Lyon*
ATTORNEYS

United States Patent Office 2,807,764
Patented Sept. 24, 1957

2,807,764
SERVOMOTOR CONTROL SYSTEM

Homer A. Engle, Los Angeles, Calif., assignor, by mesne assignments, to Viking Industries, Inc., Canoga Park, Calif., a corporation of California Application April 1, 1954, Serial No. 420,349
14 Claims. (Cl. 318—29)

This invention relates to control systems, and, more particularly, is an improvement in systems for controlling electrical motors.

Systems for controlling the direction and speed of an electrical motor using either vacuum tubes or gas tubes are well known. In the usual control system, two tubes are employed which have their anodes respectively connected to the field windings of the motor. The tubes are nonconducting in the standby condition.

A conducting bias is applied to one or the other of the tubes in order to drive the motor in the direction controlled by the tube which is rendered conducting. Servo control systems usually employ some error-signal sensing device which is actuated by a device which can be controlled by the motor. The error-signal sensing device is employed to apply this error signal to whichever one of the two tubes when conducting rotates the motor in a direction to minimize this error signal.

Heretofore, the tubes have been used to control direct current motors or alternating current motors; however, the half-wave currents obtained from the tubes have not permitted the motors to generate as much torque as they were capable of generating. To overcome this, the output of the tubes would be applied to control the flow of currents through transformer windings on the other side of which the motor would be connected. Thus, in effect, the impedance of the transformer was controlled by the tubes, and this, in turn, permitted alternating current to be drawn through the motor windings in the proper direction of rotation. It thus appears that for substantially direct connections between an alternating current motor and the tubes being used to drive it the most effective utilization of the motor could not be obtained.

It is an object of the present invention to provide a motor control circuit wherein an alternating current motor can be driven directly from the tubes used to control it.

Another object of the present invention is to provide a simple system for controlling an alternating current motor.

When a direct coupling is made between tubes and motor, the entire motor current was supplied through the tubes, and, when the current required by the motor became too large to be economically supplied through the tubes, the tubes were used to control relays. Accordingly, a feature of this invention is that direct tube drive is employed, yet the tube current carrying capacity is relatively small and relays are obviated.

Another feature of the present invention is to provide an alternating current motor control system which is more inexpensive than those heretofore employed.

Still another feature of the present invention is to provide a novel and unique servomotor control system.

These and other features of the invention are provided in a control system of the type wherein an alternating current motor has split field windings which are connected to two gas tubes. The tubes are biased to be normally nonconducting. A saturable reactor is connected between the cathode and anode of each tube. Means are provided for detecting an error signal from a device driven by said motor. The error signal is applied to the tubes and renders conducting the one of the two tubes which drives the motor in a direction to minimize the error signal.

Another embodiment is to employ the saturable reactor as an auto transformer. This is accomplished by connecting the saturable reactor between the cathode and anode of the gas tube. The motor windings are respectively connected to taps in the saturable reactor winding.

In still another embodiment of the invention a condenser is connected parallel with the saturable reactor. Its value is selected to provide parallel resonance when no current flows through the gas tube.

In operation in all of these embodiments, when the gas tube is rendered conducting, the impedance of the saturable reactor drops in view of the direct current flowing through both tube and reactor. This enables alternating current to "leak" past the tube through the saturable reactor windings to the motor. Thus, the motor receives alternating current and can develop more power than has been obtainable with systems of the prior art.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
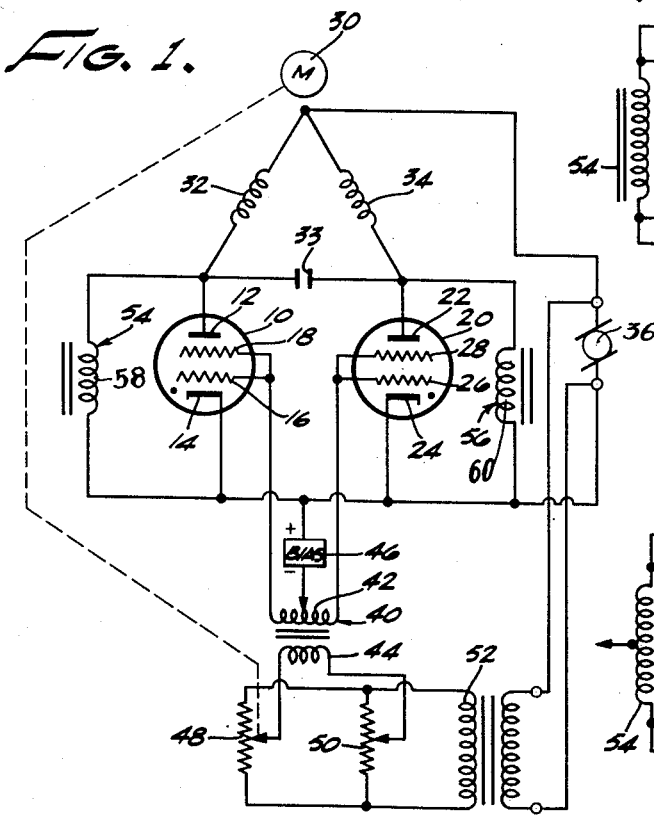
Figure 1 is a circuit diagram of the embodiment of the invention.

Referring now to Figure 1, there is seen a circuit diagram of an embodiment of the invention. This comprises a pair of gas tubes 10, 20 of the thyratron type, preferably. Each of these tubes has an anode 12, 22, cathode 14, 24, control grid 16, 26, and screen grid 18, 28 which is normally connected to the control grid. The motor 30 employed for the purpose of illustrating the embodiment of the invention is of a type commonly known as a split-field two-phase induction-type motor. One of the split fields 32 is connected to one of the anodes 12 of the gas tubes, the other of the split-field windings 34 is connected to the other gas tube anode 22. A power factor correcting condenser 33 is connected between the windings. The free ends of these windings are connected together and brought to a source of alternating current 36. The cathodes 14, 24 of the two gas tubes 10, 20 are also connected to the other side of this alternating current supply. As is well known, control of the phase excitation of the split-field windings, determines the direction of rotation of the motor.

The control grids 16, 26 of the two gas tubes are connected to the two ends of the secondary winding 42 of a transformer 40. The center tap of the transformer is connected to a bias source 46. This bias source normally maintains the gas tubes nonconducting. The primary 44 of the transformer 40 is connected to the variable arms of two potentiometers 48, 50. The two potentiometers are connected in parallel across a secondary winding of an isolation transformer 52 whose primary is connected to the source of alternating current supply 36. The movable arm of one of the potentiometers 48 is mechanically coupled to the armature of the split-phase motor 30, to be driven thereby.

Two saturable reactors 54, 56 are employed. These have their alternating current windings 58, 60 respectively connected between the cathode and anode of a different one of the gas tubes. A saturable reactor is a well-known variable impedance device which consists of a magnetic core around which there may be wound an alternating current winding and a direct current winding. As an increasingly larger amount of current is applied to the direct current winding, the magnetic core begins to saturate. The impedance to alternating current of the alternating current winding reduces as the core saturates. Removal of direct current causes the core to become desaturated, and thus the impedance of the device to alternating current increases. In the embodiment shown herein, if desired, the direct current winding (not shown) may be connected between cathode and anode and the alternating current winding also connected between cathode and anode. It has been found, however, that the D. C. winding need not be used to make the system herein operative.

The motor control system shown in Figure 1 is a servo motor system. This is not to be construed as a limitation upon the invention, but is merely shown to illustrate the potentialities of the motor control system.

The bias applied to both thyratron tubes is just below that required for firing them and, accordingly, holds them nonconducting. Alternating current is applied from the source of supply 36 to the tube anodes with the same phase. When the two potentiometer arms are placed so that they are at the same potential, the voltage potential between them and, accordingly, across the primary 44 of the transformer 40 is zero, the gas tubes will remain nonconducting. When one of the potentiometer arms, for example, the one designated as sensing control 50, is moved so that there is a potential difference between them, a voltage is produced across the transformer primary and, accordingly, across the secondary 42 of the transformer. The error voltage is at one phase at one side of the secondary and the opposite phase on the other side of the secondary. The tube anode which has voltage applied thereto in the same phase as the error-signal voltage is included in the gas tube which is rendered conductive. The pulsating direct current which ensues circulates through the saturable reactor. The effect on the saturable reactor is to cause the magnetic core to saturate, thus considerably reducing the impedance of this device to alternating current. In this manner, alternating current can flow into the motor field windings. The motor coupling to the motor-driven potentiometer 48 is made such that the potentiometer arm is driven in a direction to reduce the difference in voltage between the two potentiometer arms. Thus a servo control system is provided. It will be understood, accordingly, that the motor-driven potentiometer arm will follow the position of the potentiometer arm of the sensing control. When the tubes are not conducting the impedance of the saturable reactors is very high, and, consequently, only a very small amount of alternating current finds its way to the motor. In effect, the motor windings and the tubes and saturable reactors form one bridge, the potentiometers form a second bridge. Unbalance of the potentiometer bridge unbalances the motor bridge until a correcting balancing action has taken place.

Figure 2:
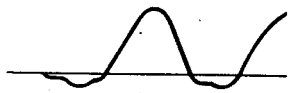
Figure 2 shows the waveform applied to the motor by prior art control devices.

In tests made without using a saturable reactor across the gas tubes, voltage from a source of 400 cycles and 115 volts was supplied to the motor windings and to the gas tubes. When one of the tubes was fired, the motor current was measured at 900 milliamperes, the voltage across the field winding measured only 65 volts pulsating direct current. The motor torque was measured at 2½ ounce inches. The waveform of current through the field winding was observed across a one-ohm resistor and is that shown in Figure 2 of the drawings. This is a typical thyratron half-wave pulsating direct current.

Figure 3:
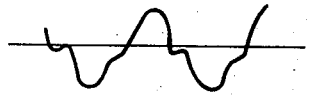
Figure 3 shows the waveform applied to the motor by employing the embodiment of the invention shown in Figure 1.

Figure 3 of the drawings shows the current waveform which is provided to the motor when a saturable reactor is connected across the gas tube. As seen, this is a full alternating current waveform. Under these conditions, the voltage at the winding was measured as 100 volts, the current drawn was 900 milliamperes, and the torque developed was 5½ ounce inches. Accordingly it will be appreciated that there is a marked improvement in the performance of the motor when the saturable reactor is employed.

Figure 4:
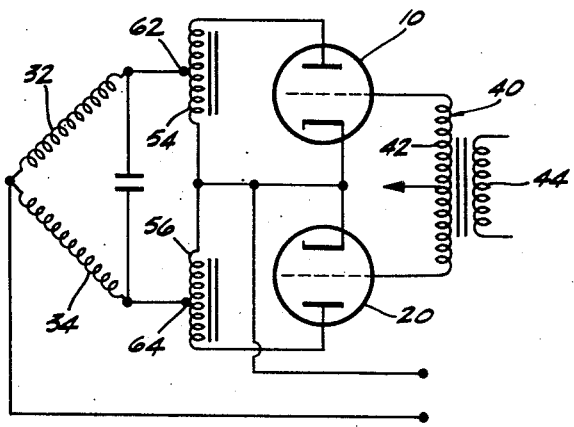
Figure 4 is a circuit diagram of a second embodiment of the invention.

Referring now to Figure 4, only the circuitry for the gas tubes is shown; the rest of the circuitry will be understood to be as shown in Figure 1. The two gas tubes 10, 20 have connected between their cathode and anode the winding of the saturable reactors 54, 56, as before. Each of the field windings 32, 34 of the motor, however, are respectively connected to tap points 62 and 64 intermediate the ends of the respective saturable reactor windings. As a result of this connection, auto-transformer operation occurs in each of the saturable reactors; the current flowing through the portion of the reactor into the motor induces an additional voltage in the remaining portion of the reactor. Accordingly, the voltage applied across the gas tube is higher by a factor determined substantially by the ratio of the windings in the motor circuit to the windings remaining in the tube circuit. The operation of the motor remains substantially unaffected.

Figure 5:
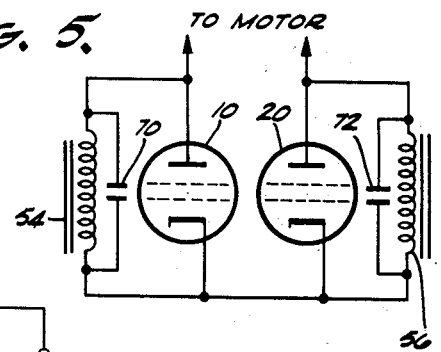
Figures 5 and 6 are respectively circuit diagrams of a third embodiment of the invention.
Figure 6:
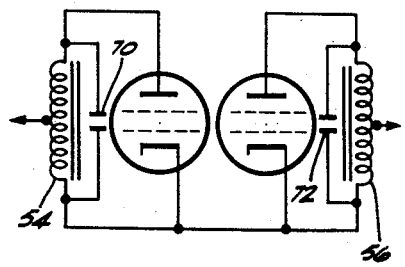

Figures 5 and 6 show another embodiment of the invention. It will be appreciated that the theory of operation herein is that the impedance of the saturable reactor is high until such time as the associated gas tube applies direct current thereto, at which time the impedance is reduced and alternating current in substantial amounts can pass therethrough. By connecting a condenser 70, 72 as shown in Figures 5 and 6 across the saturable reactors 54, 56 and by selecting the value of this condenser to be such that a parallel resonant circuit is formed, the impedance of this network is made extremely high. When this is done, the number of winding turns in the winding of the saturable reactor need not be as great as before, since the impedance reduction obtained by eliminating the winding turns is then made up by providing a parallel resonant circuit. With this expedient, the resistance of the winding is reduced, thus permitting more current to flow to the motor when the gas tube conducts. Upon current flowing through the associated gas tube, the magnetic core of the saturable reactor saturates and the circuit is no longer parallel resonant. Furthermore, both reactor and condenser co-operate to pass alternating current around the conducting gas tube.

Accordingly, there has been described and shown herein a system for controlling a motor. The system is novel, useful, and simple, and permits the application of alternating current to operate the motor, although gas tubes are used in the control thereof. Another feature of this invention is that in view of the fact that the saturable reactors are used to shunt the gas tubes, the tubes need not carry sufficient current to operate the motor. Accordingly, their size can be reduced considerably, since their utilization is effectively to saturate the reactors connected thereacross.

I claim:

1. In a control system of the type employing a pair of gas tubes each having an anode, cathode and control grid, load means coupled to said anodes to be driven, means to generate an error signal responsive to said load means, and means coupled between said means to generate an error signal and the grids of said gas tubes to feed an error signal to said gas tubes to drive said load means to minimize said error signal, the improvement in said system comprising a pair of saturable reactors, each of said saturable reactors being respectively connected between the cathode and anode of a different one of said gas tubes.

2. In a control system of the type employing a pair of gas tubes each having an anode, cathode and control grid, load means coupled to said anodes to be driven, means to generate an error signal responsive to said load means, and means coupled between said means to generate an error signal and the grids of said gas tubes to feed an error signal to said gas tubes to drive said load to minimize said error signal, the improvement in said system comprising a pair of saturable reactors, each of said saturable reactors having a winding, each of said windings being respectively connected between the anode and cathode of a different one of said gas tubes, said load means being coupled to said gas tubes at a point intermediate the ends of each of said windings.

3. In a control system of the type recited in claim 1 wherein there is a capacitance in parallel with each of said saturable reactors.

4. A control system comprising a pair of gas tubes, each having anode, cathode, and control grid, a pair of saturable reactors each having a winding, each of said saturable reactors being connected between anode and cathode of a respective one of said gas tubes, a load, said load being connected for driving to the anodes of both said gas tubes, means to apply operating potential between said load and the cathodes of said gas tubes, means responsive to said load position to generate an error signal, and means to apply a generated error signal to the control grid of one of said gas tubes to ignite said gas tube to drive said load to minimize said error signal.

5. A control system as recited in claim 4 wherein there is a separate condenser connected across each of said saturable reactors, the value of each of said condensers being selected to be in resonance with said reactor when the gas tube across which said reactor is connected is not conductive.

6. A control system comprising a pair of gas tubes, each having anode, cathode and control grid, a pair of saturable reactors each having a winding, means to connect the cathode and anode of each tube respectively to the ends of a different one of said windings, a load, means connecting said load to the respective gas tube anodes, means to apply operating potential between said load and the cathodes of said gas tubes, means to generate an error signal responsive to said load position, and means to apply said error signals to said gas tube control grids to render the one of said gas tubes conducting which drives said load to minimize said error signal.

7. A control system as recited in claim 6 wherein there is in addition a separate condenser connected across each winding having a value selected to substantially resonate with said winding when no current flows through said associated gas tube.

8. A control system comprising in combination a pair of gas tubes each having an anode, cathode and control grid, an alternating current motor, means for connecting said alternating current motor to the anodes of said gas tubes to be driven in a direction determined by the conduction of said gas tubes, means to apply operating potential between said motor and the cathodes of said gas tube, a pair of saturable reactors each of which has a winding, means connecting the winding of each saturable reactor between the cathode and anode of the respective gas tubes, means to generate a control signal, and means to apply said control signal to render conducting a predetermined one of said gas tubes to drive said motor in a desired direction.

9. A control system as recited in claim 8 wherein said means to generate a control signal includes a bridge and means coupled to said motor armature to unbalance said bridge to provide a signal having a polarity determined by the direction of unbalance, and said means to apply said control signal to said gas tubes includes a transformer having a primary winding across which said bridge is connected, and a secondary winding each end of which is connected to a respective one of said gas tube control grids.

10. A motor control system comprising a pair of gas tubes each having anode, cathode and control grid electrodes, a variable alternating current impedance, means connecting each said alternating current impedance across the anode and cathode of each of said tubes to vary said impedance in accordance with the conducting condition of said tube, means coupling said motor to said tube anodes to drive said motor in a direction determined by the one of said tubes which is conducting, means to apply operating alternating current between said motor and said cathodes, means to generate a control signal, and means to apply said control signal to render conductive a predetermined one of said tubes which drives said motor in a desired direction.

11. A control system for a split-phase winding motor comprising a pair of gas tubes each having anode, cathode and control grid electrodes, means connecting respective one ends of said split-phase windings to respective anodes of said gas tubes, means to apply alternating current between said gas tube cathodes and the other ends of said split-phase windings, a pair of saturable reactors each having a winding, means connecting each of said windings between the anode and cathode of a different one of said gas tubes, means to bias said gas tubes to be nonconductive in standby condition, and means to apply a voltage to either of said gas tubes to render the tube conductive and to thereby control the direction of rotation of said motor.

12. A control system as recited in claim 11 wherein there is in addition a condenser connected across each winding, the value of each condenser being selected to establish a parallel resonant circuit with said winding when no current flows in the associated gas tubes.

13. A control system for a split-phase winding motor comprising a pair of gas tubes each having anode, cathode, and control grid electrodes, a pair of saturable reactors each having a winding with a tap on said windings intermediate said ends, means connecting respective one ends of said split-phase windings to the respective taps on said windings, means connecting said respective windings between the anode and cathode of a different one of said tubes, means to apply alternating current between said gas tube cathodes and the other ends of said split-phase windings, means to bias said gas tubes to be nonconductive in standby condition, and means to apply a voltage to a desired one of said gas tubes to render the tube conductive and to thereby control the direction of rotation of said motor.

14. A motor control system comprising a pair of gas tubes each having anode, cathode, and control grid electrodes, a saturable reactor, means connecting each said saturable reactor across the anode and cathode of each of said tubes to vary the impedance of said saturable reactor in accordance with the conducting condition of said tube, means coupling said motor to said tube anodes to drive said motor in a direction determined by the one of said tubes which is conducting, means to apply operating alternating current between said motor and said cathodes, means to generate a control signal, and means to apply said control signal to render conductive a predetermined one of said tubes which drives said motor in a desired direction.

References Cited in the file of this patent

UNITED STATES PATENTS

| | | |
|---|---|---|
| 2,440,600 | Crosby | Apr. 27, 1948 |
| 2,529,490 | Field | Nov. 14, 1950 |
| 2,598,922 | Konick et al. | Jan. 3, 1952 |
| 2,677,086 | McAdie | Apr. 27, 1954 |

OTHER REFERENCES

Electronics in Industry, Chute, pp. 191–192, Figs. 15H and 15I, McGraw-Hill, 1946.

Electronic Instruments, Greenwood Holdam, Macrae, p. 457, McGraw-Hill, New York, 1948.